United States Patent [19]

Hartmann et al.

[11] Patent Number: 4,784,841
[45] Date of Patent: Nov. 15, 1988

[54] PROCESS FOR THE PRODUCTION OF COARSE, SCRUBBING AGGREGATES OF TITANIUM DIOXIDE PARTICLES BY OXIDATION OF TITANIUM TETRACHLORIDE IN THE VAPOR PHASE AND USE OF SAID AGGREGATES FOR THE PREVENTION OF DEPOSIT FORMATION IN THE SAME PRODUCTION PROCESS

[75] Inventors: Achim Hartmann, Pulheim; Hans Thumm, Leverkusen, both of Fed. Rep. of Germany

[73] Assignee: Kronos Titan, GmbH, Leverkusen, Fed. Rep. of Germany

[21] Appl. No.: 98,889

[22] Filed: Sep. 21, 1987

[30] Foreign Application Priority Data

Oct. 31, 1986 [EP] European Pat. Off. ........ 86115134.8

[51] Int. Cl.$^4$ ............................................. C01G 23/08
[52] U.S. Cl. ...................................... 423/613; 423/76; 423/85; 501/134
[58] Field of Search ............................ 423/613, 76, 85; 501/134

[56] References Cited

U.S. PATENT DOCUMENTS

| | | | |
|---|---|---|---|
| 2,721,626 | 10/1955 | Rick | 423/613 |
| 2,899,278 | 8/1959 | Lewis | 423/613 |
| 3,310,377 | 3/1967 | Stern et al. | 423/613 |
| 3,361,525 | 1/1968 | De Rycke et al. | 423/337 |
| 4,569,387 | 2/1986 | Hartmann et al. | 165/47 |
| 4,633,935 | 1/1987 | Hartmann et al. | 165/1 |

FOREIGN PATENT DOCUMENTS

| | | | |
|---|---|---|---|
| 599557 | 6/1960 | Canada | 423/613 |
| 717909 | 9/1965 | Canada | 423/613 |
| 1049282 | 11/1966 | United Kingdom | 336/525 |

OTHER PUBLICATIONS

Perry's Chemical Engineers' Handbook, 6th Ed., Perry McGraw Hill, N.Y., 1973, pp. 23-13-15.

Primary Examiner—Robert L. Stoll
Assistant Examiner—Paige C. Harvey
Attorney, Agent, or Firm—Burns, Doane, Swecker & Mathis

[57] ABSTRACT

A process for the production of coarse scrubbing aggregates of $TiO_2$ particles by vapor phase oxidation of titanium tetrachloride. The particle aggregates of sizes above 0.15 mm are separated from the $TiO_2$ fines by wet screening on a moving screen, calcined and returned to the process. In a preferred embodiment of the process, the titanium dioxide prior to calcination is admixed with 0.01 to 0.3% by weight alkaline hydroxides (related to anhydrous $TiO_2$), hard particle aggregates of sizes between 0.2 to 2.0 mm being generated that are returned to the hot reaction mixture and used for the prevention of deposit formation on the surfaces of the heat exchanger.

The process can be carried through in such a way that the quantities of coarse scrubbing $TiO_2$ aggregates per unit of time consumed by abrasion and newly formed by sintering are equal, their percentages in recycling $TiO_2$ thus remaining constant which simplifies the $TiO_2$ production process.

32 Claims, 1 Drawing Sheet

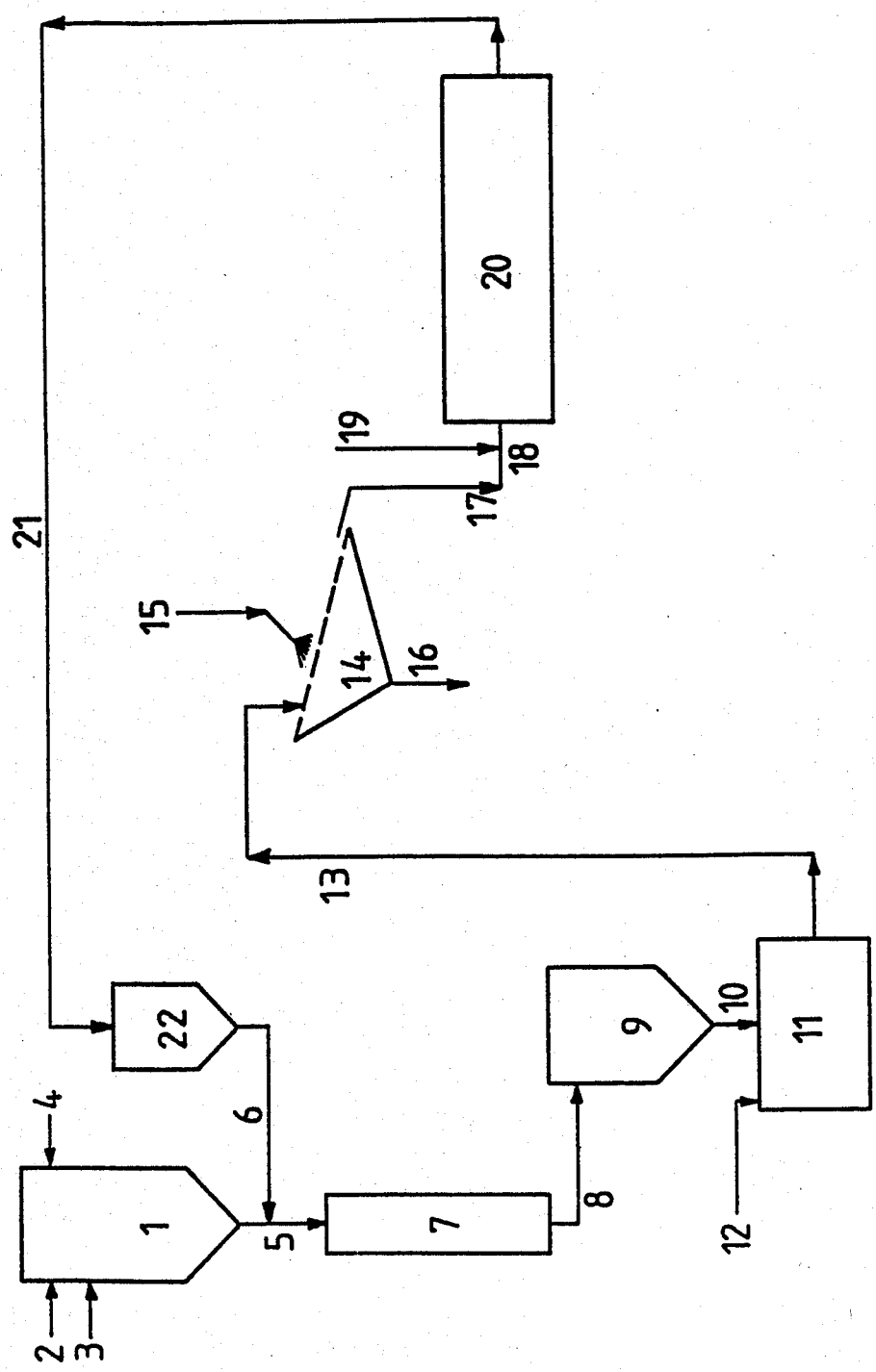

PROCESS FOR THE PRODUCTION OF COARSE, SCRUBBING AGGREGATES OF TITANIUM DIOXIDE PARTICLES BY OXIDATION OF TITANIUM TETRACHLORIDE IN THE VAPOR PHASE AND USE OF SAID AGGREGATES FOR THE PREVENTION OF DEPOSIT FORMATION IN THE SAME PRODUCTION PROCESS

BACKGROUND OF THE INVENTION

1. Field of the Invention

The present invention relates to a process for the production of coarse, scrubbing aggregates of titanium dioxide particles by oxidation of titanium tetrachloride in the vapor phase and use of the aggregates for the prevention of deposit formation in the same production process.

2. Description of the Prior Art

The production of titanium dioxide by vapor phase oxidation of titanium tetrachloride with oxygen or an oxygen-containing gas has been growing in importance compared with older processes in which titaniferous raw materials such as ores and/or slag are digested with mineral acids, preferably sulphuric acid. The reason for this growing importance is that in the vapor phase oxidation, only solid or gaseous reation products are generated and, therefore, no dilute waste acid is obtained whose reconcentration would involve additional process steps and higher operating costs.

During the oxidation of titanium tetrachloride, the temperatures in the oxidation reactor range between 1200° and 2000° C., the variation in temperature being essentially dependent on which oxidation agent is used, viz. air, oxygen or a mixture of both, and whether additional energy is introduced during oxidation, for instance in the form of a booster flame. The stream of hot reaction products (hereinafter referred to as the "reaction mixture") exiting from the oxidation reactor contains titanium dioxide in a very finely distributed form suspended in gaseous constituents.

The freshly formed $TiO_2$ particles are present at first as very reactive individual particles. During their dwell time in the hot reaction zone, most of these particles grow together to form small aggregates of sizes below 0.15 mm. The individual particles and the small particle aggregates are usable for the manufacture of titanium dioxide pigment.

Part of the small aggregates grow further and partly sinter to form larger, hard and unshapely aggregates of sizes above 0.15 mm. They preferentially form in a layer by deposition of $TiO_2$ on the surfaces of the hot reaction zone of the oxidarion reactor. This layer is continuously exposed to the abrading action of the hot reaction products passing over it but, on the other hand, is continuously regenerated by the deposition of new $TiO_2$ particles. In the course of this exchange, larger pieces of this layer are torn off the hot surfaces in an uncontrolled way at irregular intervals and thus undesirably get into the reaction mixture and are carried along with it. These large coarse $TiO_2$ aggregates are not suitable for pigment production without prior disintegration because their hardness would deteriorate the dispersibility of the pigment and their relatively broad range of sizes would deteriorate optical properties such as tinting strength and hiding power. The formation of such coarse $TiO_2$ aggregates may at best be reduced in the vapor phase oxidation of titanium tetrachloride, but cannot wholly be prevented.

Titanium dioxide produced in the vapor phase, especially when present in the form of individual particles or small particle aggregates, shows a strong trend—at its temperature on exiting from the oxidation reactor down to a temperature of about 350°C.—to build up on the cooling surfaces especially on the internal walls of the heat exchanger to form tough, firmly adhering layers which do not tend to come off by themselves. This build-up of $TiO_2$ reduees the heat transfer of the pipe walls and thus the cooling efficiency of the heat exchanger.

In order to prevent the deposition of $TiO_2$, coarse scrubbing solids of suitable shape and particle size that are chemically inert, i.e., resistant to the hot chlorine-containing reaction gases, are added to the reaction mixture at an appropriate location, i.e., downstream of the oxidation reactor. The purpose of these scrubbing solids, which are added at the lowest possible use level (relative to the $TiO_2$ generated in vapor phase oxidation), is to keep the internal walls of the heat exchanger permanently free of deposits without causing noticeable material abrasion, especially on those internal surfaces of the cooler that are inclined towards the flow direction of the reaction products. The coarse scrubbing solids must be easy and inexpensive to produce. Since the coarse scrubbing solids preferably have room temperature when added to the reaction mixture, they provide an additional cooling effect.

Numerous substances have been used as the base material for coarse scrubbing solids, such as sand, aluminum oxide, zirconium silicate, inorganic salts, etc.

It is understandable that these foreign substances contaminate the titanium dioxide and must be removed by suitable steps, such as separation in settling chambers or cyclones, or dissolution by water.

To eliminate these drawbacks, processes have been devised in which titanium dioxide is used as scrubbing solids to keep the heat exchanger surfaces free of deposits. This $TiO_2$ may be produced by the process of digesting titaniferous feedstock in acid. It is more advantageous, however, to use titanium dioxide generated in the vapor phase oxidation of titanium tetrachloride.

In the process described in DE-A-No. 14 42 758, oxidation of titanium tetrachloride can take place in a reaction chamber or a fluid-bed reactor. In the reaction chamber, the reaction constituents are used separately and the coarse $TiO_2$ scrubbing solids, which are suspended in streams of the reaction constituents or an inert carrier gas, are fed into the oxidation reactor in such a way as to hit surfaces that are accessible to the reaction constituents or their reaction products and to reduce the formation of deposits on these surfaces.

When a fluid-bed reactor is employed, titanium dioxide may be withdrawn from this reactor and, after separation, cooled and, if necessary, subjected to disintegration of particles, so that it may be directed back to the reaction mixture as an abrading material.

The introduction of solid scrubbing agents into the oxidation reactor may keep the interior reactor walls free of deposits, but the process is disadvantageous in terms of energy, because part of the energy required for heating up the reaction constituents is consumed in heating the scrubbing solids. Moreover, part of the freshly generated titanium dioxide adheres to the scrubbing solids that pass through the oxidation reactor thus leading to an undesirable particle growth. This makes it impossible to withdraw particles of a defined particle size fraction from the stream of reaction products; the coarse particle fraction must first be milled or disintegrated by some other means (e.g., particle size reduction by chlorination).

Processes in which abrasively scouring $TiO_2$ particles are introduced into the oxidation reactor therefore have not been successful in actual practice.

In the process described in U.S. Pat. No. 2,899,278, titanium dioxide produced by vapor phase oxidation of titanium tetrachloride is processed to titanium dioxide pigment by subjecting it to the usual process steps of cooling, separation of pigment from the gaseous reaction products, calcination and milling. The fine $TiO_2$ dust resulting from intensive milling (e.g., fluid energy milling) initially has no utility, but is treated to yield coarse abrading solids which are directed back to the reaction mixture.

In the process of the above patent, not only $TiO_2$ particles below a size of 0.15 mm that are usable for pigment production, but also the coarse sintered $TiO_2$ particle aggregates above 0.15 mm are subjected to the mentioned process steps, thus burdening the plant capacity with material not directly processed to pigment and decreasing the total yield of the $TiO_2$ production process.

In the process described in U.S. Pat. No. 2,721,626, coarse scrubbing solids of sizes between 0.15 and 6.35 mm, e.g., aggregated $TiO_2$ particles, are admixed with the hot reaction mixture and after cooling, separated from the reaction products in the gaseous phase in a suitable separating apparatus and again used as scrubbing solids. The dry separation of the coarse scouring $TiO_2$ aggregates larger than 0.15 mm from the finely particulated titanium dioxides in devices such as cyclones, settling chambers, air classifiers, etc. is technically unsatisfactory which means the separating effect is insufficient. As a result, the coarse $TiO_2$ aggregates recycled as scrubbing solids in the heat-exchanger always contain a percentage of fine-sized $TiO_2$ which percentage constantly and undesirably increases upon recirculation due to the steady abrasion of coarse $TiO_2$ aggregates in the heat exchanger. Consequently, the separating effect of the apparatus further deteriorates. It is not feasible to control the particle size distribution by correspondingly increasing the production of coarse $TiO_2$ aggregates as the size distribution of the $TiO_2$ aggregates exiting from the oxidation reactor is essentially determined by the reaction conditions prevailing in the oxidation reactor. In this process, the coarse $TiO_2$ scrubbing solids are obtained by calcining the filtered fine-sized $TiO_2$ at 600°-1000° C. The portion transformed into coarse aggregates during this calcination is lost for the direct production of pigment. Hence, the overall efficiency of the process is reduced.

OBJECTS AND SUMMARY OF THE INVENTION

A primary object of the invention therefore was to develop an improved process for the production of coarse $TiO_2$ scrubbing solids at the highest possible yield within the process of vapor phase oxidation of titanium tetrachloride, the hot reaction mixture being cooled, the titanium dioxide being separated from the gaseous reaction products and the coarse $TiO_2$ aggregates being separated from the $TiO_2$ fines and used as scrubbing solids in the same production process.

The foregoing object has been achieved by the present invention by the development of a process for the production of coarse scrubbing aggregates of titanium dioxide particles by vapor phase oxidation of titanium tetrachloride with an oxygen-containing gas, coarse $TiO_2$ scrubbing aggregates being commingled with the hot reaction mixture, the reaction mixture being cooled indirectly, the titanium dioxide being separated from the gaseous reaction products, the coarse titanium dioxide aggregates being separated from the $TiO_2$ fines, recovered and returned as scrubbing solids to the hot reaction mixture.

In one aspect, the process comprises:
(a) adding coarse $TiO_2$ scrubbing aggregates to the hot reaction mixture subsequent to the vapor phase oxidation;
(b) cooling the hot reaction mixture indirectly to 350°-500° C.;
(c) separating the titanium dioxide from the cooled reaction mixture;
(d) slurrying the separated titanium dioxide with water;
(e) using a moving screen to separate the coarse titanium dioxide aggregates having particle sizes above 0.15 mm present in the aqueous slurry from the $TiO_2$ fines so as to form a residue on the moving screen;
(f) treating the residue on the moving screen with an aqueous solution;
(g) treating the moving-screen residue that has been treated with an aqueous solution with an alkaline solution;
(h) calcining the treated moving screen residue; and
(i) returning the calcined material in the form of coarse $TiO_2$ scrubbing aggregates to the hot reaction mixture.

In a further aspect, the process involves treating the residue of the moving screen with an aqueous titanium dioxide suspension.

BRIEF DESCRIPTION OF THE DRAWING

The drawing is a schematic illustration of an embodiment of the invention.

DESCRIPTION OF THE PREFERRED EMBODIMENTS OF THE INVENTION

With reference to the drawing, the coarse $TiO_2$ scrubbing solids are admixed with the hot reaction mixture downstream of the oxidation reactor (1). Cooling of the reaction mixture to 350°-500° C., preferably to 400° C, takes place in a heat exchanger (7), such as is described for instance in DE-C No. 32 05 213 the contents of which are incorporated by reference. The cooled reaction mixture exiting from the heat exchanger (7) is passed through line (8) into a suitable separating device, e.g., a filter unit (9) in which the titanium dioxide is separated from the gaseous reaction products.

Small amounts of adsorbed chlorine still adhere to the surface of the titanium dioxide and have to be removed, preferably quantitatively, before the $TiO_2$ can be processed further, as otherwise expensive purification of the gases discharged from the calciner (20) would be necessary. For this purpose, the separated $TiO_2$, via a control unit such as a star valve (not included in the drawing), is passed through line (10) into a slurrying tank (11) and slurried with water to obtain a pumpable suspension that contains about 600 g $TiO_2$/liter (calculated as anhydrous $TiO_2$). The concentration of this suspension is kept more or less constant by the addition of water from line 12. The separation of the coarse TiO$_2$ aggregates larger than 0.15 mm from the TiO$_2$ fines smaller than 0.15 mm derived from the aqueous suspension has been found to be difficult. Simple screening is not possible because the meshes of a stationary screen would constantly be plugged. With a moving screen, preferably a vibrating screen (14), however, separation is feasible.

Use of a vibrating screen (14) of 0.15 mm mesh size inclined at an angle of 20-30 against the horizontal permits quantitative separation of the TiO$_2$ fines from the coarse TiO$_2$ aggregates that account for about 10-20% of the total TiO$_2$ quantity and which percentage depends on what quantity of coarse scrubbing solids is required to achieve sufficient scouring action in the heat exchanger (7).

It is a disadvantage that due to the rolling effect caused by the screen vibrations, the moist screen residue is transformed into spherical bodies of diameters up to about 40 mm which essentially maintain their size and shape when sprayed with water in the usual way, e.g., by cone jets; therefore the chlorine absorbed in these spherical bodies cannot be scrubbed out in the desired way.

By using water jets of higher percussion power—such as may be generated by fan jets via line (15), it is feasible to disintegrate the spherical bodies of the screen residue and more efficiently scrub out the chlorine. This disintegrating action is strongest when the nozzles of the fan jet are arranged in one line side by side and the angle between the axis of the jet and the screen surface is between 40° and 50°, preferably 45°.

When the fan jet is arranged this way, it is feasible to scrub 50% by weight of the initial chlorine out of the moist filter residue of the vibrating screen (14), using only 20% by weight of water, relative to the titanium dioxide to be washed (calculated as anhydrous TiO$_2$). The suspension of TiO$_2$ fines smaller than 0.15 mm, which is to be processed to pigment product, is thus not loaded with excessive amounts of liquid. After scrubbing with water, the chlorine content of the moist screen residue of the vibrating screen (14) is between 0.03 and 0.06% by weight chlorine (relative to anhydrous TiO$_2$).

The washed moist TiO$_2$ screen residue continually dropping from the vibrating screen (14) is conveyed by suitable means, e.g., a screw conveyor (18), into a rotating calciner (e.g., a rotary kiln (20)) and calcined at 700°-1000° C. During calcination, the TiO$_2$ aggregates become larger and coarser, build up deposits and form lumps of up to 50 mm in size, which may finally plug the rotary kiln (20).

Excessively coarse products show less abrading action because abrasion is essentially determined by the number of particles per unit of time that impinge upon the surface to be scoured, excessively coarse particles achieving fewer "hits". An excessively fine, flour-like material, on the other hand, is likewise unsuitable because it does not scour at all.

A screen fraction of this material of sizes between 0.2 and 4.0 mm, as is obtained for instance after a 24-hour calcination, can be used as scrubbing agents and be directed back to the reaction mixture. The loss of coarse TiO$_2$ scrubbing aggregates due to abrasion in the heat exchanger (7) must be compensated for. This can be done for instance by mixing the moist screen residue, prior to calcination, with a certain amount of an aqueous titanium dioxide suspension of a concentration of e.g., 600 g TiO$_2$/liter. The thus formed mixture comprises 70-90% by weight TiO$_2$ derived from the screen residue and 30-10% by weight TiO$_2$ derived from the suspension (both percentages refer to anhydrous TiO$_2$).

Surprisingly and instead of treatment with the aqueous titanium dioxide suspension, it was found that undesired aggregate growth and lump formation of the titanium dioxide may be prevented by treating the screen residue with an alkaline solution prior to calcination, the alkaline content of the solution corresponding to 0.01-0.20% by weight NaOH (relative to anhydrous TiO$_2$).

Growth of TiO$_2$ aggregates can also be suppressed by treating the screen residue, prior to calcination, with an alkaline solution whose alkaline content corresponds to 0.01-0.30% by weight KOH (relative to anhydrous TiO$_2$).

The screen residue may also be treated, prior to calcination, with at least one compound that splits off alkali as a result of hydrolytic cleavage or at elevated temperatures. Such compounds may be, for instance, solutions of alkali salts of organic or inorganic monobasic or polybasic acids.

Additions of 0.01 to 0.30% by weight alkali hydroxide (relative to anhydrous TiO$_2$) and calciner temperatures of 700°-1000° C. enable the production of coarse, hard TiO$_2$ aggregates of sizes between 0.15 and no more than 4 mm, preferably between 0.2 and 2 mm, which can be returned to the heat exchanger to impart abrading action. The hardness of these scrubbing solids is sufficient to definitely eliminate deposit formation in the heat exchanger (7). Upon their contact with the cooling surfaces, part of them are pulverized to finer particles, but without causing noticeable abrasion of the cooling surfaces—even in long-term operation. If less than 0.01% by weight alkali hydroxide is added to the material to be calcined, particle aggregates gradually grow during calcination. Quantities larger than the described upper limits of the alkali hydroxide initiate a remarkable reaction with the calciner lining material, mostly silica bricks. Moreover, a remarkable loss of titanium dioxide would be incurred due to the formation of alkali titanate.

Surprisingly, the addition of 0.01-0.30% by weight alkali hydroxide to the titanium dioxide prior to calcination leads to an advantageous, preferred embodiment of the process which can be carried through in such a way that the quantity of coarse scrubbing aggregates of a size above 0.15 mm that is used up by abrasion in the heat exchanger (7) is as large as the quantity newly generated by sintering in the hot reaction zone in the same period of time.

This ensures that there is a constant percentage of recycling coarse TiO$_2$ aggregates larger than 0.15 mm. There is no need for supplementation or withdrawal from outside, which greatly simplifies the process. Therefore, maintenance of the process requires only an occasional control of the percentage of the TiO$_2$ aggregates larger than 1.5 mm separated from the gaseous reaction products.

The coarse titanium dioxide aggregates produced by the process of the invention are used as scrubbing solids to prevent the formation of deposits in the production of titanium dioxide by vapor phase oxidation of titanium tetrachloride while the fine-particle titanium dioxide is processed to pigment product in the usual way. The process is illustrated in more detail by the Examples 1 to 3 and the attached drawing.

EXAMPLE 1

(Comparative Example)

Titanium tetrachloride is introduced into the oxidation reactor (1) through line (2), fuel optionally through line (3) and air through line (4). Coarse $TiO_2$ scrubbing solids of sizes between 0.2 and 2.0 mm are introduced, in a transitional section (5), via line (6), into the hot reaction mixture generated in the vapor phase oxidation of the titanium tetrachloride. The reaction mixture is cooled down to 400° C. in the heat exchanger (7) and upon leaving it, contains a total of 30.0% by weight $TiO_2$, 3.9% of which are coarse aggregates larger than 0.15 mm. The reaction mixture is passed through line (8) to the filtration unit (9) wherein the titanium dioxide is separated from the gaseous reaction products and passed through line (10) into the slurring tank (11) into which water is introduced through line (12) to the extent that an aqueous $TiO_2$ suspension is obtained whose concentration is about 600 g $TiO_2$/liter, which is kept constant by continuously adding water.

The suspension, via line (13), is conveyed onto the vibrating screen (14) of a mesh size of 0.15 mm inclined at an angle of 30° against the horizontal and electromechanically vibrated at a frequency of 1500/sec. During screening, spherical clusters of moist coarse $TiO_2$ aggregates of sizes above 0.15 mm are formed on the screen surface. These clusters may attain sizes of 10-40 mm. They are disintegrated by water jets discharged via line (15) from fan-shaped nozzles that have bores of 1 mm in diameter. The nozzles are arranged in one line side by side at 130 mm distances in such a way that the axes of the jets form an angle of 45° with the screen surface and the spray angle is 120°. The chlorine content of the disintegrated spherical bodies after scrubbing with water is 0.04 weight % Cl (relative to anhydrous $TiO_2$). The screen fraction of fines is withdrawn via line (16) and is processed to pigment product. 1070 kg/h of the moist screen residue, corresponding to 750 kg/h anhydrous $TiO_2$, are conveyed into the calciner (20) via line (17) and screw conveyor (18) and are calcined at 950° C. Subsequently the coarse $TiO_2$ aggregates are returned into the transitional section (5) via line (21), collecting tank (22) and line (6).

Table 1 shows the percentages of the various screen fractions of the calciner discharge as a function of the duration of the trial.

TABLE 1

| Particle size in mm | Screen fractions of the calciner discharge in % by weight Duration of the trials (hours) | | | | | |
|---|---|---|---|---|---|---|
| | 24 | 48 | 72 | 96 | 120 | 144 |
| above 4 | 3.1 | 8.2 | 16.7 | 22.2 | 35.8 | 60.4 |
| above 2 | 10.3 | 15.5 | 25.2 | 32.7 | 33.0 | 37.0 |
| above 1 | 14.2 | 11.0 | 12.0 | 10.0 | 15.1 | 2.6 |
| above 0.8 | 21.0 | 19.0 | 16.1 | 15.2 | 10.2 | 0.0 |
| above 0.5 | 38.1 | 34.9 | 15.7 | 12.1 | 5.9 | 0.0 |
| above 0.2 | 13.2 | 11.3 | 14.2 | 7.8 | 0.0 | 0.0 |
| below 0.2 | 0.1 | 0.1 | 0.1 | 0.0 | 0.0 | 0.0 |

Table 1 shows that during the 144 hours of the trial, the particle aggregates considerably grow. The fractions of $TiO_2$ aggregates larger than 4 and 2mm increase, whereas the smaller ones ecrease or disappear totally. In the present example, the trial was discontinued after 160 hours after the calciner discharge showed lumps of several cm in size.

EXAMPLE 2

The process conditions are the same as in Example 1 with the exception that 0.02% by weight NaOH (relative to anhydrous $TiO_2$) in the form of a 10% by weight sodium hydroxide solution is added to the calciner feed material through line (19) via conveying screw (18) prior to entering the calciner (20).

The results of the screen analysis of the calciner discharge is given in Table 2.

TABLE 2

| Particle size in mm | Screen fractions of the calciner discharge in % by weight Duration of the trials (hours) | | | | | | |
|---|---|---|---|---|---|---|---|
| | 24 | 48 | 72 | 96 | 120 | 144 | 5000 |
| above 4 | 0.4 | 0.8 | 0.0 | 0.4 | 0.5 | 0.3 | 0.5 |
| above 2 | 3.0 | 3.2 | 2.1 | 4.7 | 4.5 | 2.6 | 4.1 |
| above 1 | 7.9 | 12.1 | 10.9 | 23.1 | 14.0 | 13.1 | 12.2 |
| above 0.8 | 9.0 | 11.6 | 11.6 | 16.3 | 11.4 | 12.2 | 13.1 |
| above 0.5 | 41.0 | 41.0 | 44.2 | 37.5 | 40.7 | 42.2 | 34.7 |
| above 0.2 | 37.8 | 30.2 | 30.2 | 17.4 | 27.9 | 29.1 | 34.6 |
| below 0.2 | 0.8 | 1.1 | 1.0 | 0.6 | 1.0 | 0.5 | 0.8 |

From Table 2, it can be seen that the screen fractions after 24 hours, and after 5000 hours of calcination differ but slightly from each other. The calciner discharge consists almost exclusively of $TiO_2$ aggregates ranging between 0.2 and 2.0 mm that are suitable for use as coarse scrubbing solids and that are wholly returned to the hot reaction mixture.

EXAMPLE 3

Table 3 sets forth a summary of the recycled quantity of titanium dioxide.

TABLE 3

| Position where sample is taken | Throughput of $TiO_2$ in kg/hour Range of particle sizes | |
|---|---|---|
| | below 0.15 mm | above 0.15 mm |
| between oxidation reactor (1) and heat exchanger (7) | | |
| before addition of the coarse | 4940 | 60 |
| after addition $TiO_2$ aggregates | 4940 | 810 |
| after exiting from the heat exchanger (7) | 5000 | 750 |
| at the vibrating screen (14) | | |
| fine fraction (to be processed to pigment product) | 5000 | 0 |
| coarse fraction (screen residue = coarse $TiO_2$ aggregates to be calcined) | 0 | 750 |
| after calcination (returned to transitional section (5)) | 0 | 750 |

This example shows the following result for the coarse $TiO_2$ scrub solids above a size of 0.15 mm:

750 kg/h are constantly recycled to prevent deposit formation on the surfaces of the heat exchanger.

60 kg/h are generated in the oxidation reactor (1), the same quantity is pulverized through abrasion in the heat exchanger (7) to particles smaller than 0.15 mm. Hence, coarse $TiO_2$ scrubbing solids need neither be added nor withdrawn from the cycle.

The invention being thus described, it will be obvious that the same may be varied in many ways. Such variations are not to be regarded as a departure from the spirit and scope of the invention and all such modifications are intended to be included within the scope of the following claims.

We claim:
1. A process for the production of coarse scrubbing aggregates of titanium dioxide particles by vapor phase oxidation of titanium tetrachloride with an oxygen-containing gas thereby forming a hot gaseous reaction mixture contianing suspeneded TiO2, previously recovered coarse TiO2 scrubbing aggregates being commingled with the hot gaseous reaction mixture, the hot reaction mixture being cooled, the titanium dioxide being separated from the cooled reaction mixture, coarse titanium dioxide aggregates of sizes above 0.15 mm being separated from TiO2 fines of sizes below 0.15 mm, recovered and recycled as scrubbing solids in the hot reaction mixture, the process comprising:
   (a) adding coarse scrubbing aggregates of TiO2 particles of sizes above 0.15 mm to the hot reaction mixture subsequent to the vapor phase oxidation;
   (b) cooling the hot reaction mixture indirectly to 350°–500° C.;
   (c) separating the titanium dioxide form the cooled reaction mixture;
   (d) slurrying the separated titanium dioxide with water;
   (e) using a moving screen to separate the coarse titanium dioxide aggregates having particle sizes above 0.15 mm present in the agqueous slurry of step (d) form the TiO2 fines having particle sizes below 0.15 mm so as to form a residue on the moving screen;
   (f) treating the residue on the moving screen with an aqueous solution;
   (g) treating the moving screen residue that has been treated with an aqueous solution with an alkaline solution;
   (h) calcining the treated moving screen residue; and
   (i) returning the calcined material in the form of coarse TiO2 scrubbing aggregates to the hot reaction mixture so as to form said coarse scrubbing aggregates of TiO2 added in step (a).

2. The process of claim 1 wherein a vibrating screen is used as the moving screen to separate the suspended coarse TiO2 aggregates of sizes above 0.15 mm from the titanium dioxide fines.

3. The process of claim 2 wherein the aqueous solution used to treat the residue on the moving screen is water which is sprayed from a fan jet having nozzles arranged in one line side by side and the angle formed between an axis of each nozzle and the screen surface being from 40° to 50°.

4. The process of claim 2 wherein the aqueous solution used to treat the residue on the moving screen is water which is sprayed from a fan jet having nozzles arranged in one line side by side and the angle formed between an axis of each nozzle and the screen surface being from 40° to 45°.

5. The process of claim 3 wherein the alkaline solution has alkali content corresponding to 0.01 to 0.20% by weight NaOH (relative to anhydrous TiO2).

6. The process of claim 3 wherein the alkaline solution whose alkali content corresponds to 0.01 to 0.30% by weight KOH (relative to anhydrous TiO2).

7. The process of claim 6 wherein the alkaline solution is a solution of at least one compound which produces alkali due to hydrolytic cleavage.

8. The process of claim 7 wherein the coarse aggregates of titanium dioxide have particle sizes ranging between 0.15 and 4.0 mm.

9. The process of claim 7 wherein the coarse aggregates of titanium dioxide have particle sizes ranging between 0.2 and 2.0 mm.

10. The process of claim 8 wherein the percentages of coarse titanium dioxide aggregates of sizes above 0.15 mm returned as coarse scrubbing aggregates is constant relative to the total amount of titanium dioxide.

11. The process of claim 1 wherein the aqueous solution used to treat the residue on the moving screen is water which is sprayed from a fan jet having nozzles arranged in one line side by side and the angle formed between ana axis of each nozzle and the screen surface being from 40° to 50°.

12. The process of claim 1 wherein the aqueous solution used to treat the residue on the moving screen is water which is sprayed from a fan jet having nozzles arranged in one line side by side and the angle.formed between an axis of each nozzle and the screen surface being from 40° to 45°.

13. The process of claim 1 wherein the alkaline solution has alkali content corresponding to 0.01 to 0.20% by weight NaOH (relative to anhydrous TiO2).

14. The process of claim 1 wherein the alkaline solution whose alkali content corresponds to 0.01 to 0.300% by weight KOH (relative to anhydrous TiO2).

15. The process of claim 1 wherein the alkaline solution is a solution of at least on compound which produces alkali due to hydrolytic cleavage.

16. The process of claim 1 wherein the coarse aggregates of titanium dioxide have particle sizes ranging between 0.15 and 4.0 mm.

17. The process of claim 1 wherein the coarse aggregates of titanium dioxide have particle sizes ranging between 0.2 and 2.0 mm.

18. The process of claim 1 wherein the percentage of coarse titanium dioxide aggregates of sizes above 0.15 mm returned as coarse scrubbing aggregates is constant relative to the total amount of titanium dioxide.

19. A process for the production of coarse scrubbing aggregates of titanium dioxide particles by vapor phase oxidation of titanium tetrachloride with an oxygen-containing gas thereby forming a hot gaseous reaction mixture containing suspended TiO2, previously recovered coarse TiO2 scrubbing aggregates being commingled with the hot gaseous reaction mixture, the hot reaction mixture being cooled, the titanium dioxide being separated from the cooled reaction mixture, coarse titanium dioxide aggregates of sizes above 0.15 mm being separated form TiO2 fines of sizes below 0.15 mm, recovered and recycled as scrubbing solids in the hot reaction mixture, the process comprising:
   (a) adding coarse scrubbing aggregates of TiO2 particles of sizes above 0.15 0.15 mm to the hot reaction mixture subsequently to the vapor phase oxidation;
   (b) cooling the hot reaction mixture indirectly to 350°–500° C.;
   (c) separating the titanium dioxide from the cooled reaction mixture;
   (d) slurrying the separated titanium dioxide with water;
   (e) using a moving screen to separate the coarse titanium dioxide aggrgates having particle sizes above 0.15 mm present in the aqueous slurry of step (d) form the TiO2 fines having particle sizes below 0.15 mm so as to form a residue on the moving screen;
   (f) treating the residue on the moving screen with an aqueous solution;

(g) treating the moving screen residue that has been treated with an aqueous solution with an aqueous titanium dioxide suspension to obtain a mixture containing 70 to 90% by weight TiO$_2$ from the screen residue and 30 to 10% by weight TiO$_2$ from the suspension (both percentages relative to anhydrous TiO$_2$);

(h) calcining the mixture; and (i) returning the calcined material in the form of coarse TiO$_2$ scrubbing aggregates to the hot reaction mixture so as to form said coarse scrubbing aggregates of TiO$_2$ added in step (a).

20. The process of claim 19 wherein a vibrating screen is used as the moving screen to separate the suspended coarse TiO$_2$ aggregates of sizes above 0.15 mm from the titanium dioxide fines.

21. The process of claim 20 wherein the aqueous solution used to treat the residue on the moving screen is water which is sprayed from a fan jet having nozzles arranged in one line side by side and the angle between the axes of the jets and the screen surface being from 40° to 50°.

22. The process of claim 20 wherein the aqueous solution used to treat the residue on the moving screen is water which is sprayed from a fan jet having nozzles arranged in one line side by side and the angle between the axes of the jets and the screen surface being from 40° to 45°.

23. The process of claim 22 wherein the coarse aggregates of titanium dioxide have particle sizes ranging between 0.15 and 4.0 mm.

24. The process of claim 22 wherein the coarse aggregates of titanium dioxide have particle sizes ranging between 0.2 and 2.0 mm.

25. The process of claim 23 wherein the percentage of course titanium dioxide aggregates of sizes above 0.15 mm returned as coarse scrubbing aggregates is constant relative to the total amount of titanium dioxide.

26. The process of claim 19 wherein the aqueous solution used to treat the residue on the moving screen is water which is sprayed from a fan jet having nozzles arranged in one line side by side and the angle formed between an axis of each nozzle and the screen surface being from 40° to 50°.

27. The process of claim 19 wherein the aqueous solution used to treat the residue on the moving screen is water which is sprayed form a fan jet having nozzles arranged on one lien side by side sand the angle formed between an axis of each nozzle and the screen surface being from 40° to 45°.

28. The process of claim 19 wherein the coarse aggregates of titanium dioxide have particle sizes ranging between 0.15 and 4.0 mm.

29. The process of claim 19 wherein the coarse aggregates of titanium dioxide have particle sizes ranging between 0.2 and 2.0 mm.

30. The process of claim 19 wherein the percentage of coarse titanium dioxide aggrgates of sizes above 0.15 mm returned as coarse scrubbing aggregates is constant relative to the total amount of tiatanium dioxde.

31. The process of claim 6 wherein the alkaline solution is a solution of at least one compound which produces alkali at elevated temperatures.

32. The process of claim 1 wherein the alkaline solution is a solution of at least one compound which produces alkali at elevated temperatures.

* * * * *